(No Model.)

C. C. GILMAN.
UNDERGROUND CONDUIT FOR ELECTRIC WIRES OR CABLES.

No. 424,057. Patented Mar. 25, 1890.

Witnesses:
W. E. Bowen
Douglas Alexander

Inventor
Chas. C. Gilman
per Wm. C. Behrens
atty.

UNITED STATES PATENT OFFICE.

CHARLES CARROLL GILMAN, OF ELDORA, IOWA.

UNDERGROUND CONDUIT FOR ELECTRIC WIRES OR CABLES.

SPECIFICATION forming part of Letters Patent No. 424,057, dated March 25, 1890.

Application filed August 28, 1889. Serial No. 322,228. (No model.)

*To all whom it may concern:*

Be it known that I, CHARLES CARROLL GILMAN, a citizen of the United States, and a resident of Eldora, Hardin county, Iowa, have invented a new and useful Improvement in Underground Conduits for Electric Wires or Cables, of which the following is a specification.

My invention relates to underground conduits for electric wires or cables; and it consists in the combination, with the metallic pipes arranged to contain the wires or cables, of an insulating-sheathing and an intermediate filling, as hereinafter fully described and claimed.

Figure 1:
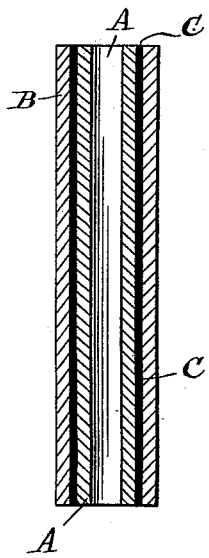
Figure 2:
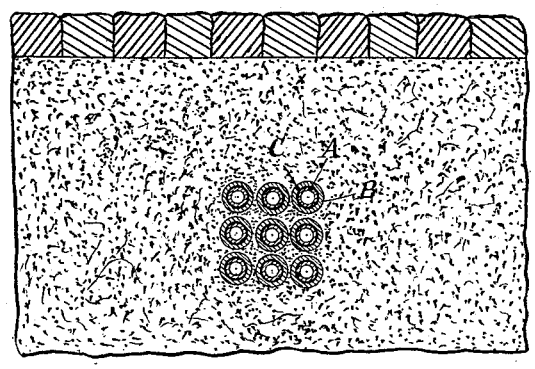

In the accompanying drawings, forming a part of this specification, Figure 1 is a longitudinal cross-section of a covered pipe embodying my invention; and Fig. 2 shows a cross-section of a conduit constructed in accordance therewith, a series of covered pipes being laid together in the ground without any further protection.

In many portions of metropolitan cities, particularly beneath the streets, it is found to be impracticable to bury electrically-charged wires in conduits without first inclosing them in long iron tubes or pipes, and these latter are sometimes buried in the ground without the intervention of sub-conduits of other material surrounding them. In either case practical experiment has demonstrated that the loss of a large percentage of current is sustained by reason of induction, the surrounding pipe becoming charged by the inclosed wires and giving off its electricity to substances touching. To overcome the objections mentioned I propose to inclose these pipes in hollow tubes of porous earthenware of a size slightly larger than said pipes, filling the space between the two, as well as saturating the porous tube itself with mineral asphaltum or other equivalent substance which would afford electrical insulation and make the tubes water-proof. Owing to the tender texture of the earthenware when made porous enough to answer for such covering and to readily absorb the melted bituminous substances, it is not practicable to make cylinders of them greater than two or three feet in length; hence to afford complete coverings for iron tubes sixteen or twenty feet long, or longer, several sections of the same must be united together to effect the purpose desired. This may be accomplished by setting the iron pipes A on end and slipping over the uppermost end the porous earthenware sections B, made a couple of sizes larger to afford easy adjustment, until the complete sheathing of the iron tube from end to end, including the socket, is attained. Before thus applying the sheathing-sections they should be first treated to a bath of melted asphaltum, raised to a boiling-point, say 312° Fahrenheit.

As it is impartant to secure water-tight joints where the porous sections fit together, the kettle, vat, or shallow iron tank used for melting the asphaltum (which may be made portable, if desired, substantially like those employed by roofers who employ bituminous cements) should be placed near and handy to the work, that the sections when removed from the kettle may at the same time be slipped over the end of the upright pipe and be adjusted to place on each other before the bituminous covering shall fairly cool or set. If, on account of the temperature of the air, this be impracticable, the sections may be allowed to fully cool after the removal from the bath, and the ends subsequently heated or dipped the second time to effect a joint.

Before immersion in the melted pitch the porous sections should be heated to an equal or greater degree, so that by driving out the air from the cells of the material the pitch may more readily enter and occupy its place. After the iron tube has been completely surrounded with the sheathing, the sections of which have been cemented together, as described, the space between the same—*i. e.*, the space between the outside of the iron pipe and the inside of the porous covering—may be completely filled with melted asphaltum C by pouring the same in at the top, the aperture at the bottom being securely closed by placing the end of the pipe into a box or even with the ground. Apertures which may, subsequent to treatment, show themselves at joints may be cured by pouring in melted asphaltum or smoothing over with a hot iron, and the junctions or couplings at the ends of the long iron pipes covered, as described, where they come together may be insulated and made water-tight by wrapping with several thicknesses of canvas cloth saturated with melted asphaltum. Pipes thus covered are protected against oxidation, from inflammation by contact with hot pipes, and may be safely buried in the ground without protection of conduits, which latter serve to become the receptacles of explosive gases.

Having thus described my invention, what I claim, and desire to secure by Letters Patent, is—

1. An underground electric conduit-pipe consisting of an inner metallic pipe inclosing the wires, an outer tube of porous earthenware, and an intermediate layer of asphaltum, substantially as described.

2. An underground electric conduit-pipe consisting of an inner metallic pipe inclosing the wires, an outer tube of porous earthenware treated with asphaltum, and an intermediate layer of asphaltum, substantially as described.

3. An underground electric conduit consisting of a number of pipes laid together, each pipe consisting of an inner metal pipe inclosing the wires, an outer porous earthenware tube treated with asphaltum and an intermediate layer of asphaltum, and the junctions of all being insulated, substantially as described.

In testimony that I claim the foregoing as my invention I have signed my name, in presence of two witnesses, this 20th day of July, 1889.

CHARLES CARROLL GILMAN.

Witnesses:
JOHN L. DODGE,
C. H. BOOTH.